United States Patent
Shimura

[19]

[11] Patent Number: 5,978,171
[45] Date of Patent: *Nov. 2, 1999

[54] INFORMATION SIGNAL REPRODUCING APPARATUS WITH DIVERSE MODE TRACKING CONTROL

[75] Inventor: Yukio Shimura, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/924,491

[22] Filed: Aug. 27, 1997

Related U.S. Application Data

[63] Continuation of application No. 08/336,339, Nov. 9, 1994, abandoned.

[30] Foreign Application Priority Data

Nov. 16, 1993 [JP] Japan .................................. 5-286744
Nov. 17, 1993 [JP] Japan .................................. 5-288269

[51] Int. Cl.$^6$ .................................................. G11B 5/584
[52] U.S. Cl. ..................... 360/77.14; 360/70; 360/77.13; 386/79
[58] Field of Search ................................. 360/10.2, 10.3, 360/77.14, 77.13, 77.12, 73.04, 70, 64, 10.1, 77.15, 75, 73.05; 386/78, 79

[56] References Cited

U.S. PATENT DOCUMENTS

| | | | |
|---|---|---|---|
| 4,197,562 | 4/1980 | Kikuya et al. ............................ | 360/64 |
| 4,426,666 | 1/1984 | Kobayashi et al. ..................... | 360/10.3 |
| 4,680,648 | 7/1987 | Takayama ............................... | 360/10.2 |
| 4,878,133 | 10/1989 | Takimoto ............................... | 360/10.3 |
| 5,065,259 | 11/1991 | Kubota et al. ........................... | 360/32 |
| 5,166,834 | 11/1992 | Mester ................................... | 360/10.3 |
| 5,432,655 | 7/1995 | Nakamura et al. ..................... | 360/10.2 |
| 5,477,398 | 12/1995 | Ichikawa et al. ....................... | 360/10.2 |
| 5,490,017 | 2/1996 | Nakamura ............................... | 360/10.2 |

FOREIGN PATENT DOCUMENTS

| | | | |
|---|---|---|---|
| 98285 | 4/1994 | Japan ................................... | 360/10.3 |
| 203433 | 7/1994 | Japan ................................... | 360/10.3 |
| 203435 | 7/1994 | Japan ................................... | 360/10.3 |

*Primary Examiner*—Alan Faber
*Attorney, Agent, or Firm*—Robin, Blecker & Daley

[57] ABSTRACT

In a reproducing apparatus for reproducing an information signal from a recording medium on which a number of recording tracks are formed in parallel to each other and on which the information signal is recorded with a pilot signal component superimposed on the information signal periodically at intervals of a predetermined number of tracks, a pair of reproducing heads are arranged to reproduce signals by concurrently tracing mutually adjacent tracks, a switching part is arranged to selectively output the signals reproduced by the reproducing heads, and the pilot signal component included in the output of the switching part is used in controlling the positions of the reproducing heads relative to the recording medium.

15 Claims, 9 Drawing Sheets

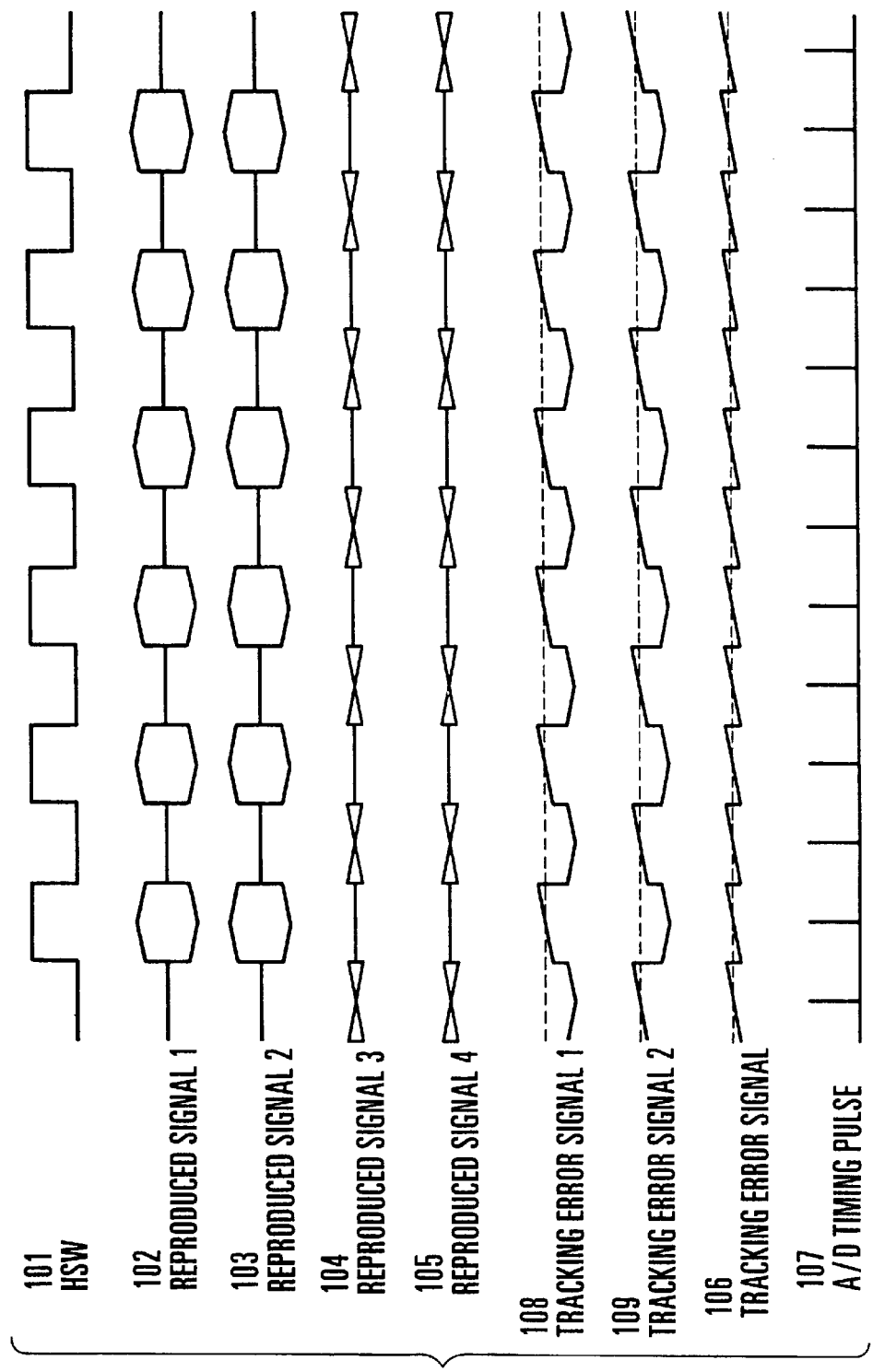
F I G. 2

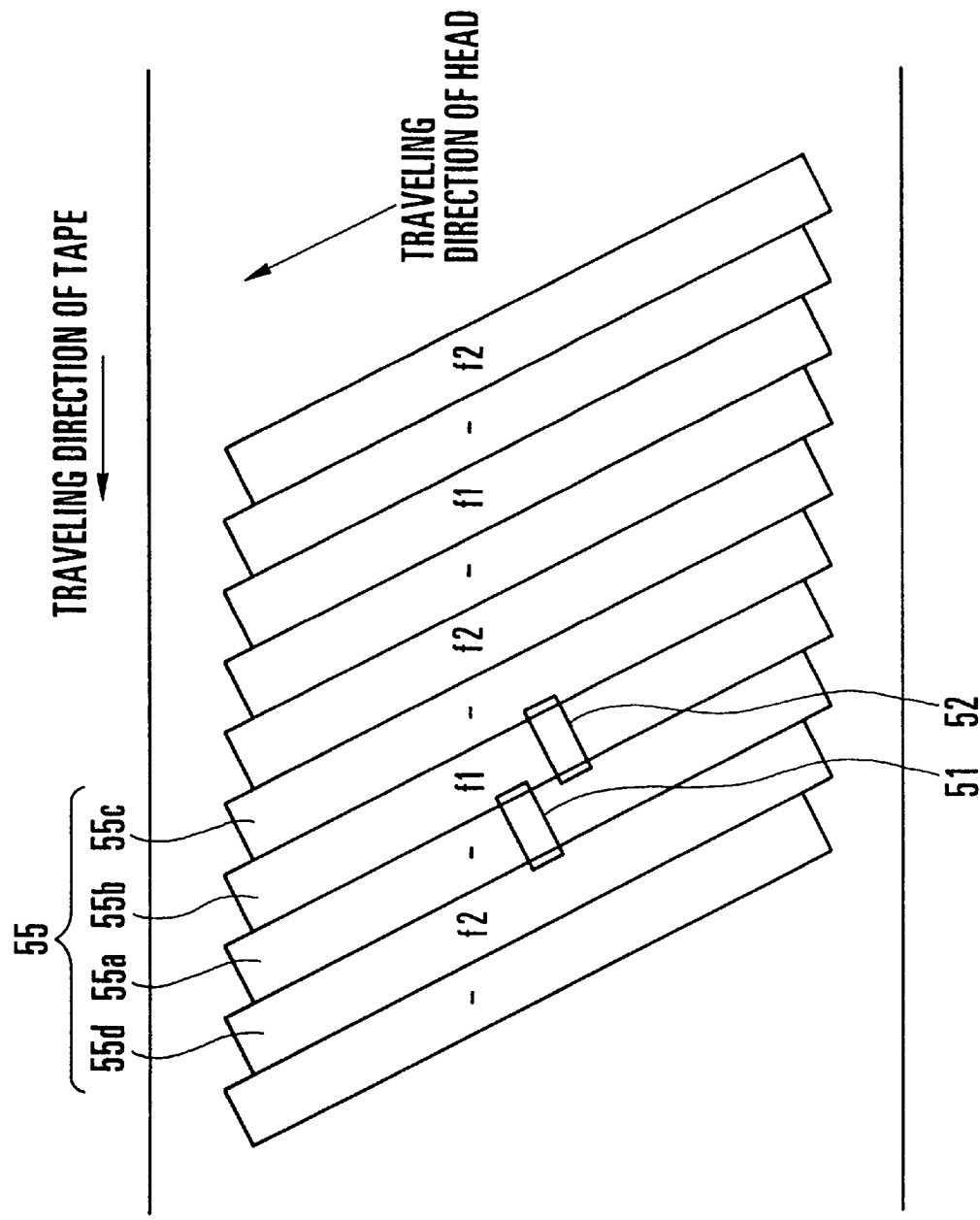

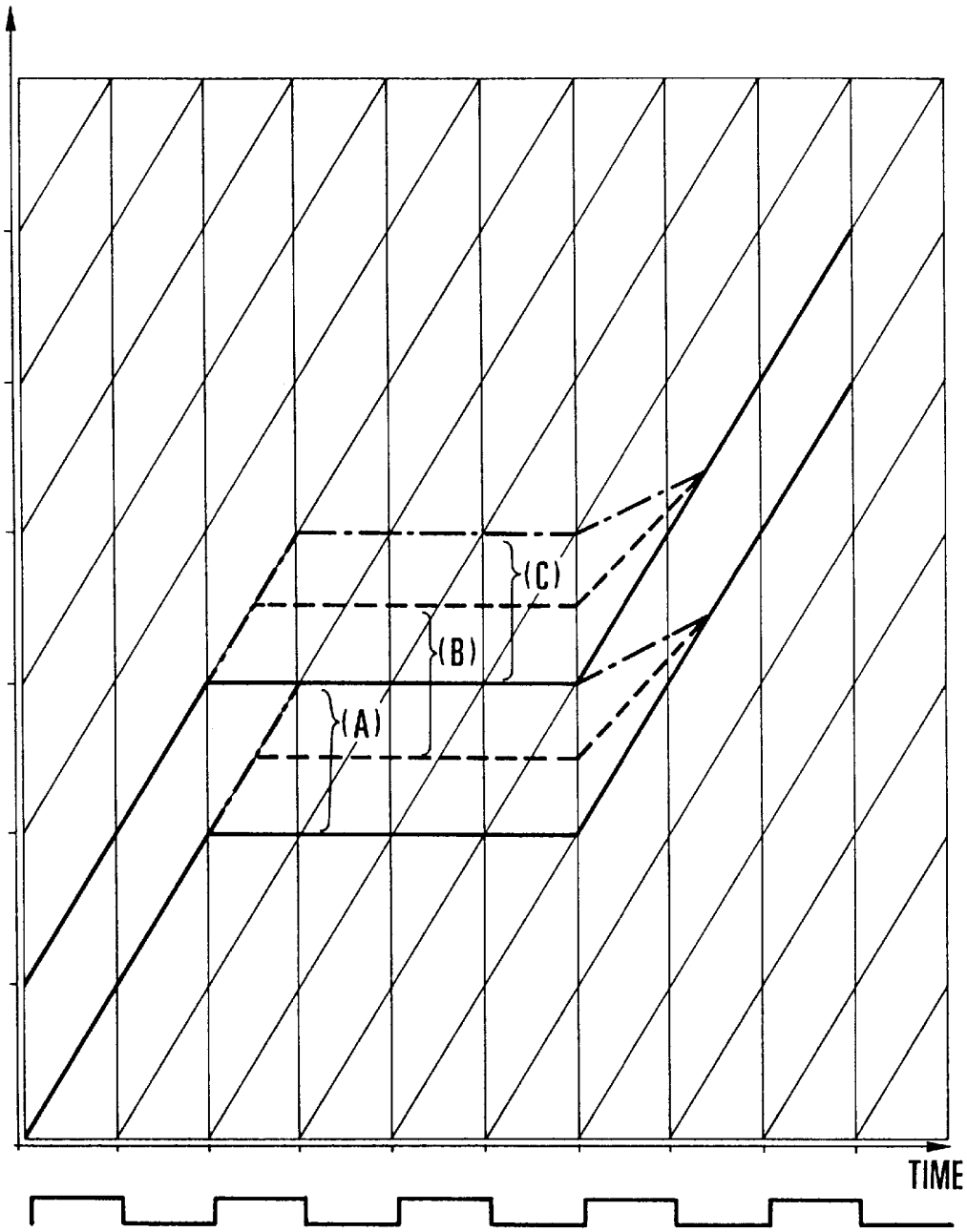
FIG.9
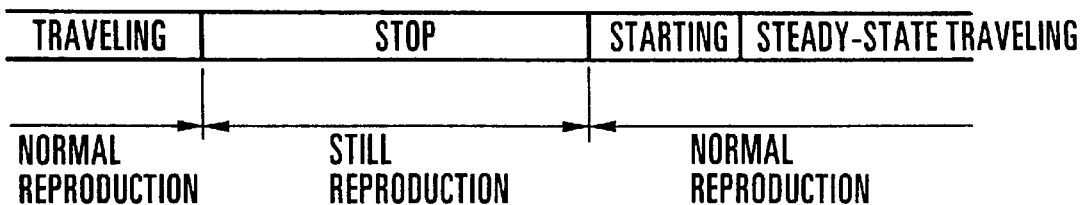

INFORMATION SIGNAL REPRODUCING APPARATUS WITH DIVERSE MODE TRACKING CONTROL

This is a continuation application under 37 CFR 1.62 of prior application Ser. No. 08/336,339, filed Nov. 9, 1994, now abandoned.

BACKGROUND OF THE INVENTION

1. Field of the Invention

This invention relates to a signal reproducing apparatus and more particularly to tracking control to be performed in reproducing a signal from a recording medium on which a plurality of tracks are formed in parallel.

2. Description of the Related Art

Reproduction tracking control systems which have heretofore been proposed and practically used for home video tape recorders (hereinafter referred to as home VTRs) include a dedicated control track system called a CTL system and a 4fATF system. In the CTL system, a fixed magnetic head is arranged at a part of a tape path to record a vertical synchronizing periodic signal separately from a recording signal in the longitudinal direction of the tape. In the 4fATF system, a rotary head which records and reproduces a main signal is arranged to recurrently record pilot signals having four different relatively low frequencies in a state of being superimposed on the main signal in tracks in which the main signal is recorded and, at the time of reproduction, a tracking error signal (an ATF error signal) is obtained by comparing crosstalk components of the pilot signals which are reproduced from the two adjacent tracks on both sides of a mainly reproduced track.

It has recently become a general tendency to arrange home VTRs to give a high image quality and to digitally process signals. As a result, some home VTRs recently developed are arranged to be capable of recording and reproducing a relatively great amount of information by divisionally recording one frame amount of image signal in a plurality of tracks. Some new tracking control systems that are applicable to such VTRs are now being developed.

The new tracking control systems include a system, wherein two different pilot signal components are recorded in every other track in a state of being superimposed on the main recording signal (hereinafter this system will be referred to as a 2fATF system). The two different pilot signal components are superimposed by various methods. In one superimposing method, analog pilot signals are arranged to be mixed with the recording signal. In another method, a digital modulation process is controlled in such a way as to have the pilot signal eventually superimposed on the recording signal.

Further, tracking control systems arranged for a slow reproduction mode include an intermittent slow system whereby the tape is alternately caused to travel and to come to a stop and another system whereby the tape is caused to travel at a predetermined speed which is slower than a tape speed employed in recording.

However, according to the new tracking control system called the 2fATF system, the tracking error signal is obtained from only the pilot signals that are reproduced by some of heads. In a reproduction mode in which the tape is caused to travel at the same speed as the speed employed in recording, an effective tracking error signal can be obtained for every period of tracing. However, in the event of the slow reproduction mode in which the tape is caused to travel at a slower speed than the speed employed at the time of recording, the number of tracing steps which give effective tracking error signals decreases to deteriorate the performance of the tracking control system.

Further, in cases where a slow reproduction is performed by intermittently transporting the tape or where the tape is caused to start moving from a stopped state, some period of time is required before a stable tracking state is obtained without any dropout in a reproduced signal because, in such a case, the stopped position of the tape varies with the state of the apparatus or a speed at which the tape has been traveling before the stop. It is inevitable to have a reproduced image disturbed under such a condition either during the slow reproducing process or at the beginning of a normal reproduction.

SUMMARY OF THE INVENTION

It is an object of this invention to provide a signal reproducing apparatus which is arranged to solve the above-stated problems of the prior art.

It is another object of this invention to provide a signal reproducing apparatus which is capable of carrying out tracking control in an improved manner in cases where a recording medium is caused to travel for reproduction at a speed which differs from a speed employed in recording.

Under this object, a reproducing apparatus for reproducing an information signal from a recording medium on which a number of recording tracks are formed in parallel to each other and on which the information signal is recorded with a pilot signal component superimposed on the information signal periodically at intervals of a predetermined number of tracks is arranged as an embodiment of this invention to include a pair of reproducing heads arranged to be capable of concurrently tracing mutually adjacent tracks, switching means for selectively outputting signals reproduced by the pair of reproducing heads, and control means for controlling a relative position of each of the reproducing heads with respect to the recording medium by using the pilot signal component included in an output of the switching means.

A reproducing apparatus arranged as another embodiment of this invention to reproduce an information signal from a recording medium on which a number of recording tracks are formed in parallel to each other and on which the information signal is recorded with a pilot signal component superimposed on the information signal includes a reproducing head, means for forming a tracking error signal indicating a relative position of the reproducing head with respect to a specific recording track by using the pilot signal component included in a signal reproduced by the reproducing head, transport means for transporting the recording medium, and control means for controlling a characteristic of the transport means obtained at the start of a transporting action on the recording medium on the basis of the tracking error signal obtained when the recording medium is at a stop.

These and other objects and features of this invention will become apparent from the following detailed description of embodiments thereof taken in connection with the accompanying drawings.

BRIEF DESCRIPTION OF THE DRAWINGS

FIG. 2 is a timing chart showing the waveforms of outputs of various parts of the VTR shown in FIG. 1 obtained with the VTR in a slow motion reproduction mode.

FIG. 4 shows a track pattern formed on a tape by the VTR shown in FIG. 1.

FIG. 9 shows the tracing loci of the heads of the VTR shown in FIG. 6.

DETAILED DESCRIPTION OF THE PREFERRED EMBODIMENTS

A VTR which is arranged as a first embodiment of this invention is first described as follows.

Figure 1:
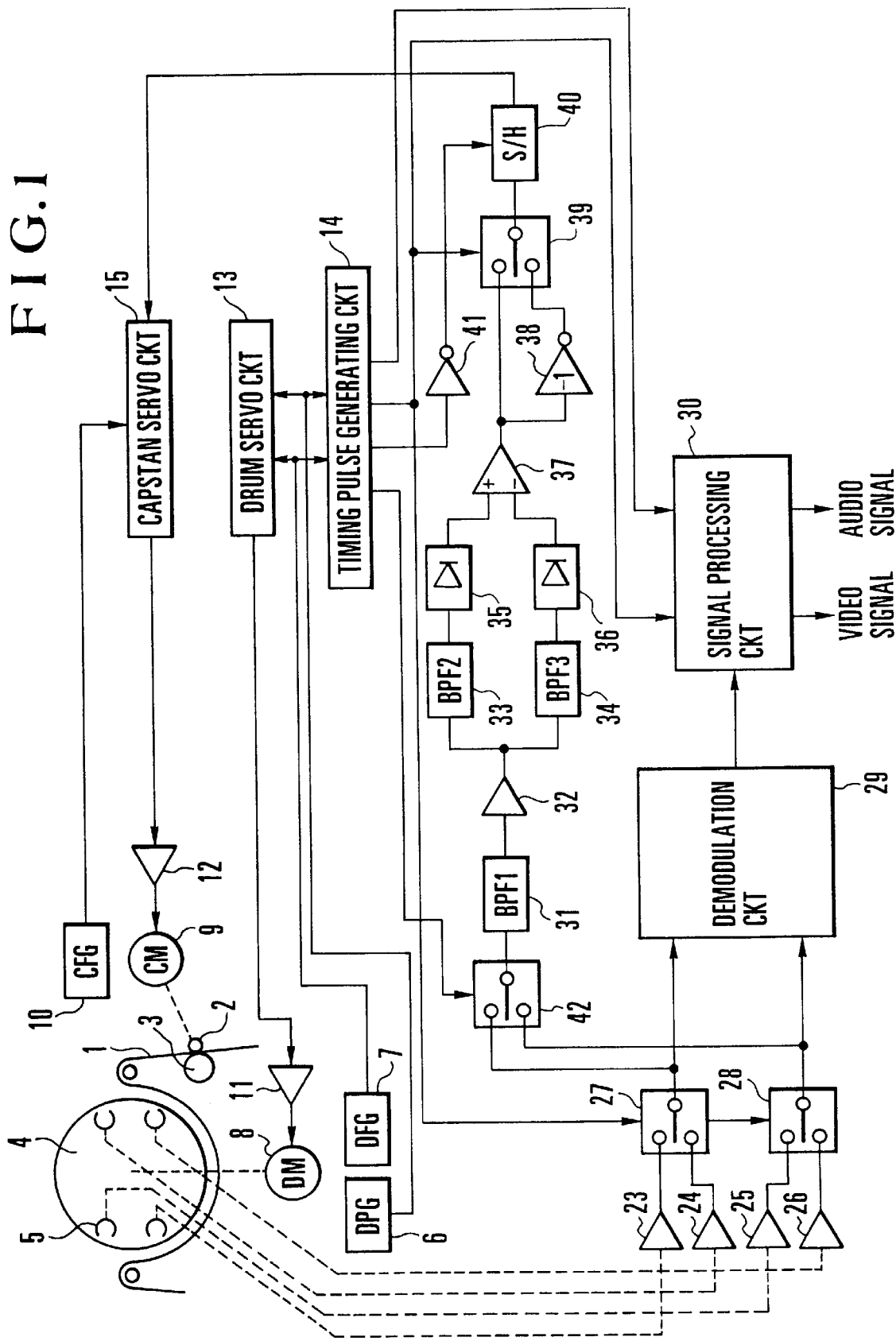
FIG. 1 is a block diagram showing the arrangement of the reproduction system of a VTR which is arranged as an embodiment of this invention.

FIG. 1 shows in a block diagram the arrangement of a reproduction system of the VTR. FIG. 2 shows in a timing chart the waveforms of various parts obtained when a slow reproducing operation is performed by transporting a tape in the normal direction at a ½ speed.

In FIG. 1, the illustration includes a magnetic tape 1, a capstan 2, a pinch roller 3, a helical scanning drum 4, a plurality of heads 5 which are mounted on the drum 4, a PG sensor 6 arranged to detect the rotation phase of the drum 4, an FG sensor 7 arranged to detect the rotational frequency of a drum motor 8, the drum motor 8, a capstan motor 9 which is connected to the capstan 2, an FG sensor 10 arranged to detect the rotational frequency of the capstan motor 9, a driving circuit 11 for the drum motor 8, a driving motor 12 for the capstan motor 9, a drum servo circuit 13 arranged to control the drum motor 8, a timing pulse generating circuit 14 arranged to generate various timing pulses in synchronism with the rotation of the drum 4, a capstan servo circuit 15 arranged to control the capstan motor 9, reproduction amplifiers 23 to 26 arranged to amplify signals reproduced by the plurality of heads 5, switch circuits 27 and 28 arranged to select reproduction outputs, a demodulation circuit 29 arranged to demodulate reproduced signals which have been modulated in recording, a signal processing circuit 30 arranged to restore a reproduced video signal to its original state by carrying out various processes such as time base and error correcting processes and an expanding process, a first band-pass filter BPF1 31 for extracting a pilot signal from the reproduced signal selected by a switch circuit 42, an amplifier 32 arranged to amplify the reproduced pilot signal, a second BPF2 33 arranged to extract only a component f2 from the reproduced pilot signal, a third BPF3 34 arranged to extract only a component f1 from the reproduced pilot signal, a detection circuit 35 arranged to convert the component f2 into a DC state, a detection circuit 36 arranged to convert the component f1 into a DC state, a differential amplifier 37 arranged to receive the outputs of the two detection circuits 35 and 36, an inverter circuit 38, a switch circuit 39 provided for change-over of the output of the differential amplifier 37 and that of the inverting circuit 38, a sample-and-hold (S/H) circuit 40 arranged to sample and hold a signal outputted from the switch circuit 39, an inverter circuit 41, and the switch circuit 42 which is arranged to selectively output one of the reproduced signals outputted from the switch circuits 27 and 28.

Referring to FIG. 2, head switching (HSW) pulses 101 are provided for selecting each of reproducing heads ch1 to ch4 in synchronism with the rotation of the drum 4. A reproduced signal 102 consists of a main signal and a pilot signal which are reproduced by the head ch1. A reproducing signal 103 consists of a main signal and a pilot signal reproduced by the head ch2. A reproduced signal 104 consists of a main signal and a pilot signal reproduced by the head ch3. A reproduced signal 105 consists of a main signal and a pilot signal reproduced by the head ch4. A tracking error signal 106 is obtained by selecting and processing the pilot signals reproduced by the heads ch1 and ch3 or the pilot signals reproduced by the heads ch2 and ch4. A/D timing pulses 107 are provided for sampling a tracking error signal. A tracking error signal 108 is obtained by selecting and processing the pilot signals reproduced by the heads ch1 and ch3. A tracking error signal 109 is obtained by selecting and processing the pilot signals reproduced by the heads ch2 and ch4.

Figure 3A:
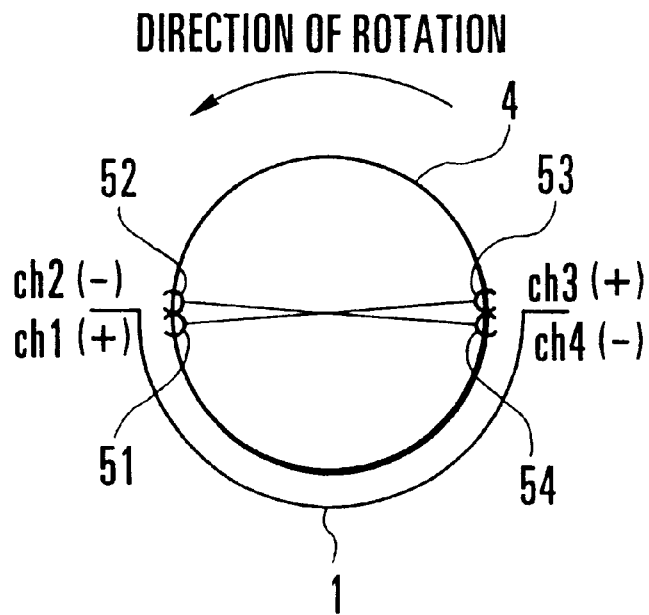
FIGS. 3(A) and 3(B) show the arrangement of heads of the VTR shown in FIG. 1.
Figure 3B:
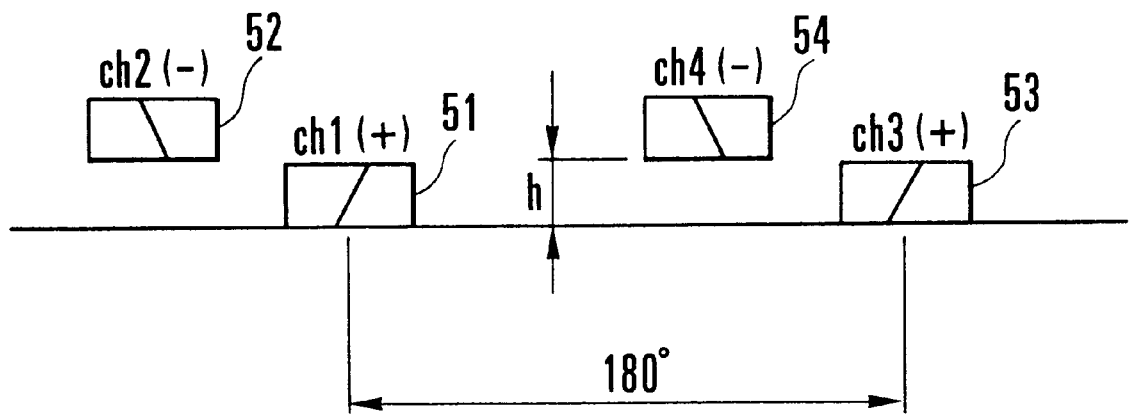

FIGS. 3(A) and 3(B) show the arrangement of the heads of this embodiment. FIG. 3(A) shows the rotary drum 4 as viewed from above it. A reference numeral 1 denotes a tape. A numeral 4 denotes the rotary drum. A numeral 51 denotes a head ch1 arranged to have a positive azimuth angle. A numeral 52 denotes a head ch2 arranged to have a negative azimuth angle. A numeral 53 denotes a head ch3 arranged to have a positive azimuth angle. A numeral 54 denotes a head ch4 arranged to have a negative azimuth angle.

FIG. 3(B) shows the height at which each of the heads 51 to 54 is mounted on the rotary drum 4. These heads 51 to 54 are shown as viewed from their front sides with the rotary drum 4 rotated. The heads ch1 and ch2 are paired and arranged adjacently to each other. The heads ch3 and ch4 are paired and arranged adjacently to each other. Each pair of heads is opposed to the other pair at an angle of 180 degrees. As apparent from FIG. 3(B), the heads ch2 and ch4 are offset upward as much as a distance "h" respectively from the heads ch1 and ch3. The head arrangement is such that two tracks can be concurrently traced for recording or reproduction every time the rotary drum 4 makes a half turn. Therefore, a greater amount of information can be recorded and reproduced.

FIG. 4 shows a pattern of recording tracks formed by the VTR of this embodiment. In FIG. 4, a reference numeral 51 denotes the head ch1 having a positive azimuth angle. A numeral 52 denotes the head ch2 having a negative azimuth angle. A numeral 55 denotes a row of tracks including tracks 55a to 55d. No pilot signal is superimposed on the recording signal recorded in the tracks 55a and 55c. A pilot signal corresponding to the component f1 is superimposed on the signal recorded in the track 55b. A pilot signal corresponding to the component f2 is superimposed on the signal recorded in the track 55d.

Figure 5:
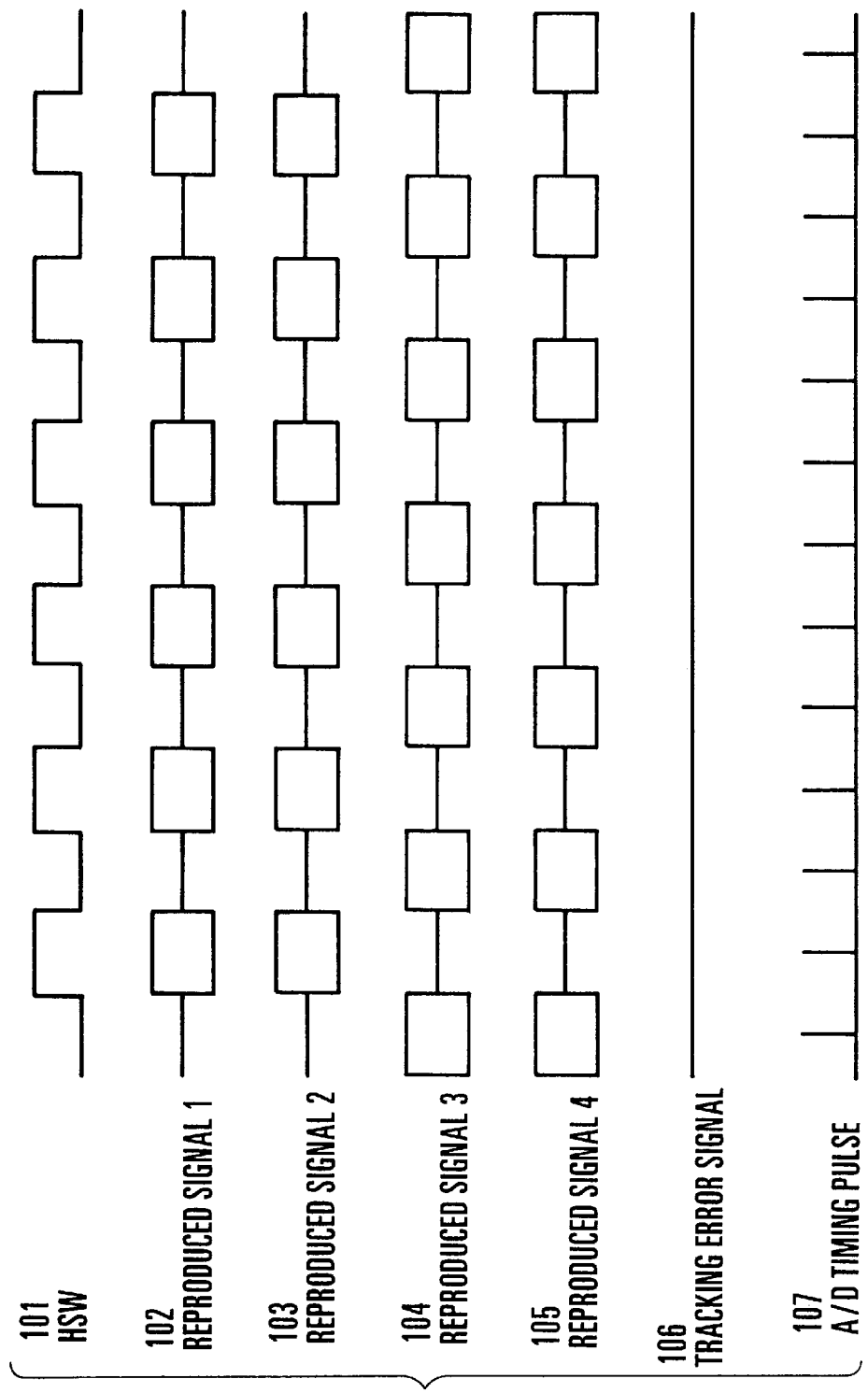
FIG. 5 is a timing chart showing the waveforms of outputs of various parts of the VTR shown in FIG. 1 obtained with the VTR in a normal reproduction mode.

FIG. 5 shows in a timing chart the waveforms of various parts of the VTR obtained in a normal reproduction mode of the VTR. In FIG. 5, reference numerals 101 to 107 denote the same signals as those shown in FIG. 2. In the normal mode of reproduction (at a normal tape speed), as in the case of FIG. 5, an effective tracking error signal can be obtained by every tracing action from the pilot signal included in the signal 102 reproduced by the head ch1 and the pilot signal included in the signal 104 reproduced by the head ch3.

Referring to FIGS. 1 and 2, the characteristic operation of the VTR (the first embodiment) is described as follows. A signal which has been recorded on the tape 1 shown in FIG. 1 in the manner as shown in FIG. 4 is reproduced by the plurality of heads 5 and amplified by the amplifiers 23 to 26 into reproduced signals. The amplifier 23 outputs the signal reproduced by the head ch1. The amplifier 24 outputs the signal reproduced by the head ch3. The amplifier 25 outputs the signal reproduced by the head ch2. The amplifier 26 outputs the signal reproduced by the head ch4.

The reproduced signal from the head ch1 or the reproduced signal from the head ch3 is selected by the switch circuit 27. The switch circuit 28 selects the output of the head ch2 or ch4. The reproduced signals thus selected are respectively supplied to an ATF system and a signal processing system. In the signal processing system, the signal is demodulated by the demodulation circuit 29. The output of the demodulation circuit 29 is supplied to the signal processing circuit 30 to be subjected to a time base correcting process, an error correcting process, an expansion process, etc. The signal thus processed is subjected to an analog conversion process to be restored to an original video signal and an original audio signal. The signal processing circuit 30 outputs the video and audio signals to the outside.

In the ATF system, on the other hand, the switch circuit 42 selects the output of the head ch1 or ch3 or the output of the head ch2 or ch4. The first BPF 31 then extracts a pilot signal from the signal selected. The extracted pilot signal is amplified by the amplifier 32. Then, from the amplified pilot signal, the component f2 is extracted by the second BPF2 33 and the component f1 by the third BPF3 34. The components f2 and f1 are supplied respectively to the detection circuits 35 and 36 to become detection signals.

The detection signals thus obtained are supplied to the differential amplifier 37. The differential amplifier 37 obtains, from them, a tracking error signal, which represents a difference in level between the detection signal of the component f1 and the detection signal of the other component f2. The tracking error signal is outputted from the differential amplifier 37.

A correct tracking error signal can be obtained from the pilot signal in a case where the pilot signal is included in the reproduced signal 102 reproduced by the head ch1 (FIG. 2) with the tape transported at the ½ speed in the normal direction. However, a tracking error signal obtained from the pilot signal included in the reproduced signal 104 reproduced by the head ch3 is obtained in an off-track state and is hardly usable as a tracking control signal. An effective tracking error signal is, therefore, obtained once per tracing period of the head ch1. Conversely, in a case where tracking is performed using the heads ch2 and ch4, a tracking error signal of an off-track state is obtained from the pilot signal included in the signal 103 reproduced by the head ch2 while a correct tracking error signal is obtained from the pilot signal included in the signal 105 reproduced by the head ch4. Hence, an effective tracking control signal is obtained once per tracing period of the head ch4.

In the case of this embodiment, the pilot signal reproduced by the head ch1 is selected when the tracking is made with the pair of heads ch1 and ch2 in the normal direction at the ½ tape speed. When the tracking is made with the other pair of heads ch3 and ch4, the pilot signal reproduced by the head ch4 is selected. Therefore, even in the event of slow reproduction with the tape transported at the ½ speed in the normal direction, tracking control can be adequately carried out as the effective tracking error signal can be obtained for every period of tracing in the same manner as in the case of a normal reproducing operation. In other words, a tracking error signal is obtained from one of the pair of heads tracing adjacent tracks as the head traverses the track. Therefore, the signal reproduced by the head which gives the tracking error signal is selected by the switch 42. The tracking error signal thus can be obtained more often than in a case where the tracking error signal is obtained only from signals reproduced by the heads ch1 and ch3.

In the case of the first embodiment, the VTR is arranged to be of a four-head type using two pairs of heads. However, this invention is not limited to this arrangement. The concept of this embodiment can be introduced into any recording/reproducing apparatus using N pairs of heads as long as its tracking error detecting system is arranged not to superimpose any pilot signal on the main signal periodically at intervals of M tracks.

Further, the concept of this embodiment can be introduced into any reproducing apparatus that is of the pilot signal recording type not superimposing any pilot signal on the main signal periodically at intervals of a predetermined number of tracks and is arranged to obtain a tracking error signal from a signal reproduced by a head which is scanning (or tracing) the tracks in which no pilot signal is superimposed on the main signal.

The sample-and-hold circuit included in this embodiment can be replaced with an A/D converter.

The concept of this embodiment applies to both a magnetic recording and/or reproducing apparatus performing digital recording and a magnetic recording and/or reproducing apparatus performing analog recording.

As described above, the VTR of this embodiment is arranged such that, in the reproduction mode of causing the tape to travel at a slower speed than a speed employed at the time of recording, effective pilot signals are selected from among the pilot signals reproduced by all the heads and a tracking error signal is obtained from the selected pilot signals. The VTR is, therefore, capable of adequately carrying out tracking control.

Figure 6:
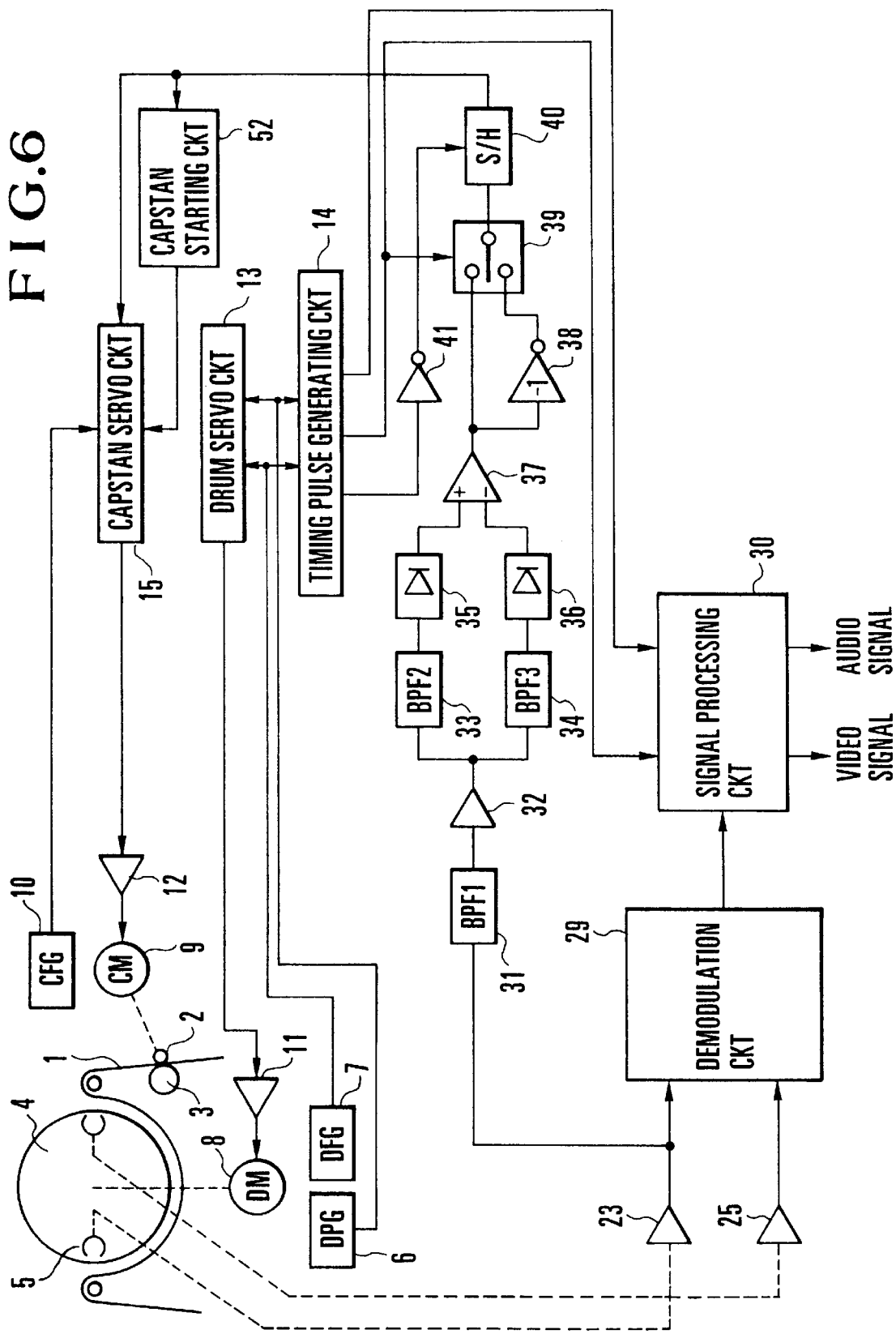
FIG. 6 is a block diagram showing in outline the arrangement of the reproduction system of a VTR which is arranged as another embodiment of this invention.

FIG. 6 shows in outline the arrangement of a reproduction system of a digital VTR which is arranged as a second embodiment of this invention. In FIG. 6, all the parts arranged in the same manner as those of the first embodiment shown in FIG. 1 are indicated by the same reference numerals and the details of them are omitted from the following description.

In the case of the second embodiment, only two heads ch1 and ch2 are arranged on the drum 4 to revolve at a phase difference of 180 degrees between them. Signals reproduced by these heads ch1 and ch2 are amplified respectively by amplifiers 23 and 25. The outputs of the amplifiers 23 and 25 are supplied to the demodulation circuit 29 to be demodulated there. The output of the amplifier 23 is supplied also to a tracking control system through the first BPF1 31. In FIG. 6, a reference numeral 52 denotes a capstan starting circuit which controls the starting characteristic of the capstan motor 9.

Figure 7A:
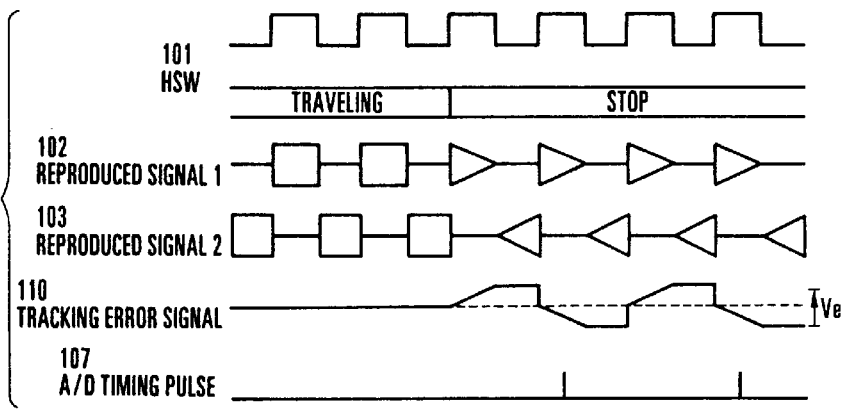
FIGS. 7(A), 7(B) and 7(C) are timing charts showing waveforms of outputs of various parts of the VTR of FIG. 6 obtained when the operating mode of the VTR is changed from a reproduction mode over to a stop mode.
Figure 7B:
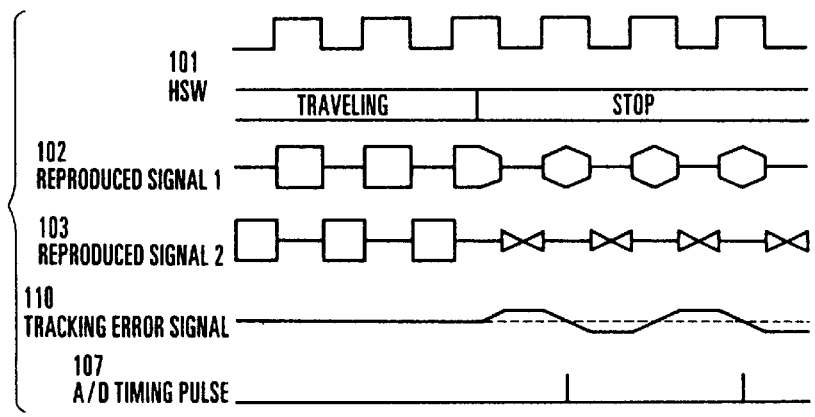
Figure 7C:
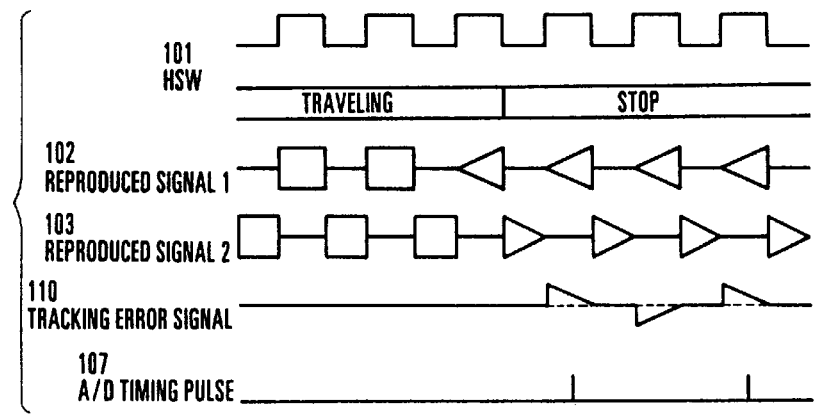

FIGS. 7(A), 7(B) and 7(C) are timing charts showing the waveforms of the outputs of various parts of the VTR of FIG. 6 obtained when the operating state of the VTR shifts from a normal reproducing state to a tape stop state.

Referring to FIGS. 7(A) to 7(C), a reference numeral 101 denotes head switching (HSW) pulses which are used for selection of the reproducing head ch1 or ch2 in synchronism with the rotation of the drum 4. A numeral 102 denotes a reproduced signal which is reproduced by the head ch1 and consists of a main signal and pilot signals. A numeral 103 denotes a reproduced signal which is reproduced by the head ch2 and consists of the main signal and pilot signals. A numeral 110 denotes a tracking error signal obtained by processing the pilot signals reproduced by the head ch1. A numeral 107 denotes A/D timing pulses which are used for sampling the tracking error signal 110. FIGS. 7(A), 7(B) and 7(C) show the timing of operation obtained when a state of normal reproduction at a standard (normal) tape speed shifts to a state of still reproduction with the tape at a stop while tracing locus parts (A), (B) and (C) shown in FIG. 9 are in process. FIG. 7(A) corresponds to the tracing locus part (A), FIG. 7(B) to the tracing locus part (B) and FIG. 7(C) to the tracing locus part (C).

Figure 8A:
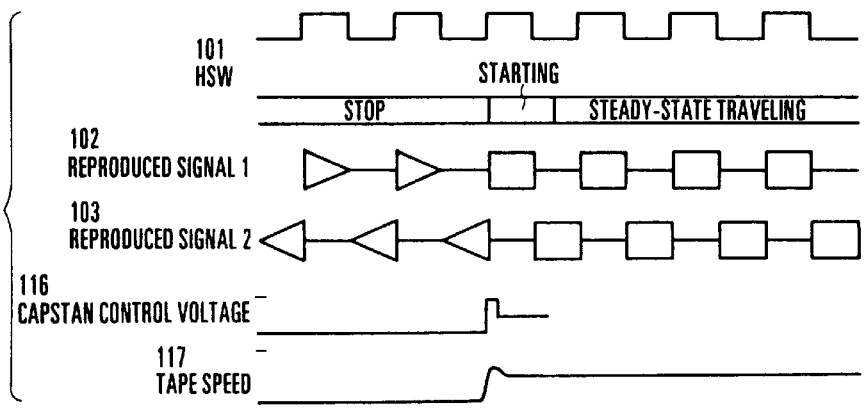
FIGS. 8(A), 8(B) and 8(C) are timing charts showing waveforms of outputs of various parts of the VTR of FIG. 6 obtained when the operating mode of the VTR is changed from the stop mode over to the reproduction mode.
Figure 8B:
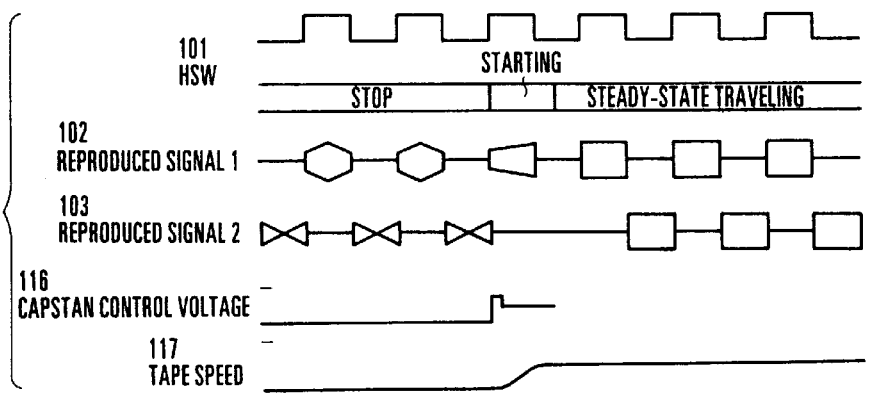
Figure 8C:
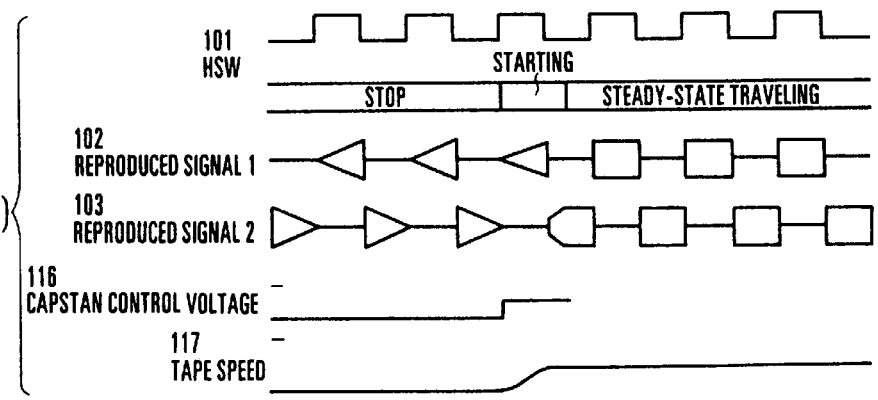

FIGS. 8(A), 8(B) and 8(C) are timing charts showing the waveforms of various parts obtained when the VTR of FIG. 6 shifts from a state of still image reproduction (with the tape at a stop) shifts to the state of normal reproduction. In these figures, reference numerals 101, 102 and 103 denote the same signals as those shown in FIGS. 7(A), 7(B) and 7(C). A numeral 116 denotes a capstan control voltage which is a driving voltage for starting the capstan motor 9. A numeral 117 denotes the traveling speed of the tape.

FIGS. 8(A), 8(B) and 8(C) respectively show the timing of operation obtained when the state of still image reproduction (with the tape at a stop) shifts to the state of noramal reproduction (with the tape caused to travel at a standard speed in the normal direction) while the tracing locus parts (A), (B) and (C) of FIG. 9 are in process, like in the case of FIGS. 7(A), 7(B) and 7(C).

FIG. 9 shows how the heads are tracing tracks in the case of the second embodiment. In FIG. 9, the axis of abscissa shows a time base and the axis of ordinate the amount of movement of the tape. Each of rhombic shaped parts represents a track. In this case, the mode of the VTR is a slow reproduction in which the apparatus shifts from the normal reproduction to the still reproduction and from the still reproduction to the normal reproduction. The tape speed shifts from the standard speed to a stop and from the stop to the standard speed.

The parts (A), (B) and (C) of FIG. 9 show respectively the tracing loci of the heads. The part (A), indicated by full lines, represents a case where the tape is brought to a stop too soon and before arrival at a desired stopping position. The part (B), indicated by broken lines, represents a case where the tape is brought to a stop exactly at the desired stopping position. The part (C), indicated by one-dot-chain lines, represents a case where the tape is brought to a stop too late and after arrival at the desired position.

The following describes with reference to these drawings the characteristic operation of the embodiment.

A signal is recorded in a manner as shown in FIG. 4 on the tape 1 which is shown in FIG. 6. The signal recorded is reproduced by the plurality of heads ch1 and ch2. The signals thus reproduced are amplified by the reproduction amplifier 23 and 25 as reproduced signals. The reproduced signal obtained by the head ch1 is outputted from the amplifier 23. The reproduced signal obtained by the head ch2 is outputted from the amplifier 25. These reproduced signals are supplied to the ATF system and the signal processing system.

At the signal processing system, the reproduced signals from the heads ch1 and ch2 are demodulated by the demodulation circuit 29. The output of the demodulation circuit 29 is supplied to the signal processing circuit 30 to be subjected to various processes including a time base correcting process, an error correcting process, an expanding process, etc. The signal thus processed is restored to original video and audio signals through an analog conversion process. The video signal and the audio signal thus obtained are outputted to the outside.

The ATF system, on the other hand, operates as follows. A pilot signal included in the reproduced signal is extracted by the first BPF1 31. The pilot signal is amplified by an amplifier 32. The amplified pilot signal is supplied to the second BPF2 33 and third BPF 33 and 34. The second BPF2 33 extracts a pilot signal component f2. The third BPF3 34 extracts a pilot signal component f1. The outputs of these BPFs 34 and 34 are supplied to the detection circuits 35 and 36 to become detection signals.

Each of the detection signals is supplied to the differential amplifier 37. The differential amplifier 37 then obtains a tracking error signal 110 which is as shown in FIG. 7((A), 7(B) or 7(C) from a difference in level between the detection signals of the signal components f1 and f2. The tracking error signal 110 outputted from the differential amplifier 37 when the tape is at a stop is converted, according to the A/D timing pulses 107, by the capstan starting circuit 52 into information on one of three stepwise stopping positions, which are as follows:

(1) A position obtained before a desired stopping position when the level of the tracking error signal is equal to or less than $\frac{1}{3}$ Ve (the tracing locus (A) of FIG. 9): (2) The desired stopping position obtained when the level of the tracking error signal is above $\frac{1}{3}$ Ve and equal to or less than $\frac{2}{3}$ Ve (the tracing locus (B) of FIG. 9) and (3) A position obtained after the desired stopping position when the level of the tracking error signal is above $\frac{2}{3}$ Ve (the tracing locus (C) of FIG. 9). The symbol "Ve", shown in FIG. 7(A), denotes a maximum amplitude level of the tracking error signal. The information on the above-stated three stepwise stopping positions becomes three stepwise values of capstan control voltages to be used for starting the capstan motor 9 shown in FIG. 6. The three capstan control voltages are arranged to be used as follows:

(a) In the case of the stopping position (1), the starting voltage is applied to the capstan motor 9 at its maximum value: (b) In the case of the stopping position (2), the starting voltage is applied at 70% of the maximum value and (c) In the case of the stopping position (3), the starting voltage is applied at 40% of the maximum value.

In accordance with the arrangement of the second embodiment described above, the capstan motor can be started always at one and the same timing irrespective of the stopping position as shown in FIG. 9. Therefore, the heads are allowed to trace the tracks always in the same manner when the tape is in a steadily traveling state. Since the movement of the tape always can be adequately started irrespective of the stopping position, images can be adequately obtained from the beginning of reproduction.

The second embodiment is a two-head type VTR and arranged to be of the 2fATF system whereby two different pilot signals are recorded in a state of being superimposed on the main signal in every other track. However, the concept of the embodiment can be introduced also into any apparatus that is of the ATF system of recording pilot signals by superimposing them on a main signal, irrespective of the arrangement of its heads.

Further, the second embodiment is arranged to control the control characteristic of the capstan motor or the maximum applying voltage at the start of transportation of the tape. This arrangement, however, may be changed to control the starting timing by leaving the control characteristic or the maximum applying voltage unvaried.

As described above, according to the arrangement of the second embodiment, the control characteristic of the capstan motor or the maximum applying voltage is controlled on the basis of information on the stopping position obtained from the tracking error signal when the tape is at a stop. This enables the embodiment to always adequately start the movement of the tape irrespective of the stopping position, so that adequate images can be obtained from the beginning of a reproducing operation.

What is claimed is:

1. A reproducing apparatus for reproducing an information signal from a recording medium on which a number of recording tracks are formed in parallel to each other and on which the information signal is recorded with a pilot signal component superimposed on the information signal periodically at intervals of a predetermined number of tracks, comprising:

a) a pair of reproducing heads arranged to be capable of concurrently tracing mutually adjacent tracks;
   b) switching means for selectively outputting first and second signals reproduced concurrently by said pair of reproducing heads respectively;
   c) control means for controlling a relative position of each of said reproducing heads with respect to the recording medium by using the pilot signal component included in an output of said switching means; and
   d) reproducing means for reproducing the information signal by using both of said first and second signals.

2. An apparatus according to claim 1, wherein said apparatus has a first mode in which the recording medium is transported at a first speed corresponding to a speed employed in recording and a second mode in which the recording medium is transported at a second speed which differs from the first speed, and wherein said switching means is arranged to selectively output signals reproduced by said pair of reproducing heads in the second mode and to output only a signal reproduced by a specific one of said pair of reproducing heads in the first mode.

3. An apparatus according to claim 2, wherein said control means includes forming means arranged to form a tracking error signal indicating an amount of discrepancy in position between a predetermined track and one of said pair of reproducing heads which is reproducing the signal being outputted from said switching means, and a sample-and-hold circuit arranged to sample and hold the tracking error signal.

4. An apparatus according to claim 3, wherein said pair of reproducing heads are arranged to periodically trace the recording medium, and, in the first mode, said sample-and-hold circuit periodically samples the tracking error signal at intervals of one tracing period of said reproducing head.

5. An apparatus according to claim 4, wherein, in the second mode, said sample-and-hold circuit periodically samples the tracking error signal at intervals of one switching period of said switching means.

6. An apparatus according to claim 2, wherein the second speed is slower than the first speed.

7. An apparatus according to claim 1, wherein the recording medium is a magnetic tape, and the information signal is a digital video signal.

8. An apparatus according to claim 1, further comprising another pair of reproducing heads which are arranged separately from said pair of reproducing heads to be capable of concurrently tracing mutually adjacent tracks, and wherein said pair of reproducing heads and said another pair of reproducing heads are arranged to alternately trace the recording medium.

9. An apparatus according to claim 8, wherein said switching means includes a first switching circuit arranged to selectively output in a predetermined periodicity a signal reproduced by one of said pair of reproducing heads or by one of said another pair of reproducing heads, a second switching circuit arranged to selectively output in the predetermined periodicity a signal reproduced by the other of said pair of reproducing heads or by the other of said another pair of reproducing heads, and a third switching circuit arranged to selectively output an output of said first switching circuit or an output of said second switching circuit.

10. An apparatus according to claim 1, wherein said pilot signal component includes a plurality of kinds of pilot signal components, each of the plurality of kinds of pilot signal components being recorded in the recording tracks periodically at intervals of n tracks (n: an integer not less than 4).

11. An apparatus according to claim 10, wherein said plurality of kinds of pilot signal components include a first pilot signal component and a second pilot signal component, and wherein said control means includes comparison means for comparing with each other the first and second pilot signal components included in signals reproduced by said reproducing heads.

12. An apparatus according to claim 11, wherein each of said first pilot signal component and said second pilot signal component is recorded in the recording tracks periodically at intervals of four tracks, and wherein no pilot signal component is recorded in every other track among the recording tracks.

13. A reproducing apparatus for reproducing an information signal from a recording medium on which a number of recording tracks are formed in parallel to each other and on which the information signal is recorded with pilot signal components superimposed on the information signal periodically at intervals of a predetermined number of tracks, comprising:

a) head means including a plurality of reproducing heads;
   b) control means for controlling a relative position of each of said plurality of reproducing heads with respect to the recording medium by using the pilot signal component included in a signal reproduced by said head means;
   c) transport means for transporting the recording medium; and
   d) switching means for switching said apparatus between a plurality of modes including a first mode in which the recording medium is transported at a first speed corresponding to a speed employed in recording and a second mode in which the recording medium is transported at a second speed which differs from the first speed,
   wherein said control means is arranged to use the pilot signal components included in signals reproduced by a first number of reproducing heads when switched into the first mode and a second number of reproducing heads when switched into the second mode, said first number being smaller than said second number, and
   wherein said information signal is reproduced by using the second number of said heads in said first and second modes.

14. An apparatus according to claim 13, wherein said head means includes a plurality of pairs of reproducing heads, each pair of reproducing heads being arranged to be capable of concurrently tracing mutually adjacent tracks.

15. An apparatus according to claim 14, wherein said control means is arranged to use only a signal reproduced by one of each pair of reproducing heads in the first mode and to use signals reproduced by both of each pair of reproducing heads in the second mode.

* * * * *

UNITED STATES PATENT AND TRADEMARK OFFICE
CERTIFICATE OF CORRECTION

PATENT NO.  : 5,978,171
DATED       : November 2, 1999
INVENTOR(S) : Yukio Shimura It is certified that error appears in the above-identified patent and that said Letters Patent is hereby corrected as shown below:

Col. 8, line 9, delete "BPF 33 and 34" and insert -- BPF3 34 --.
Col. 8, line 12, after "of these" delete -- BPFs 34 and 34 --.
Col. 8, line 16, delete "FIG. 7((A)." and insert -- FIG. 7(A). --.

Signed and Sealed this

Tenth Day of April, 2001

Attest:

NICHOLAS P. GODICI

Attesting Officer    Acting Director of the United States Patent and Trademark Office